INVENTOR:
WILHELM RINKER
BY
Richardson, Davis and Nordon
ATTYS.

Nov. 22, 1960 W. RINKER 2,960,775
INSTRUMENT FOR STATISTICAL MEASUREMENTS
Filed Nov. 5, 1957 5 Sheets-Sheet 2
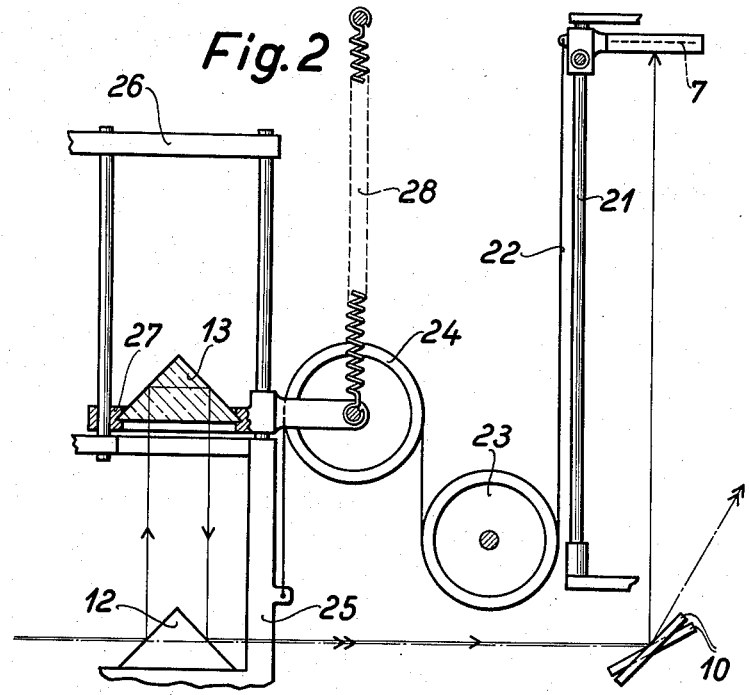
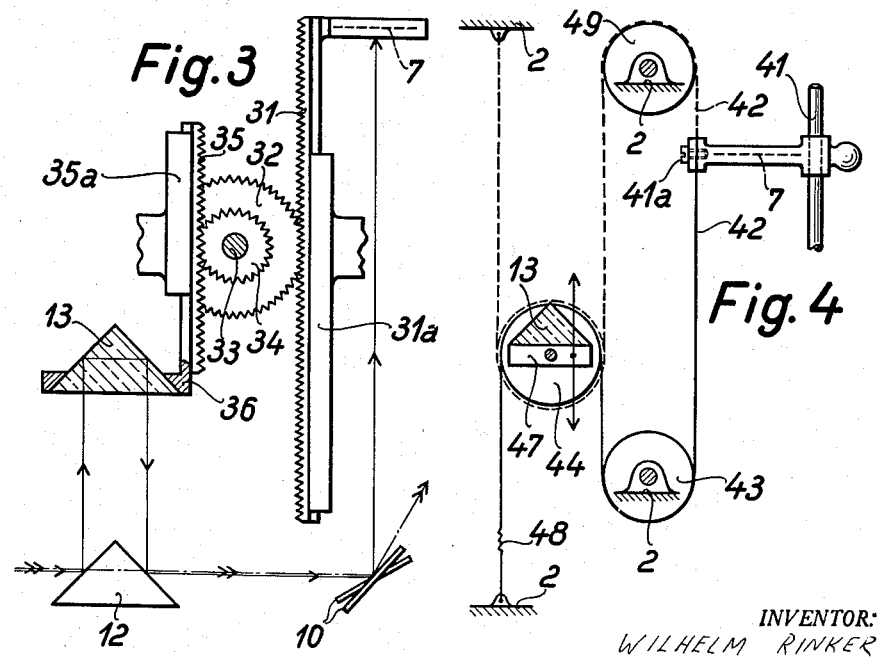
INVENTOR:
WILHELM RINKER
BY
Richardson, Davis and Nardon
ATTYS.

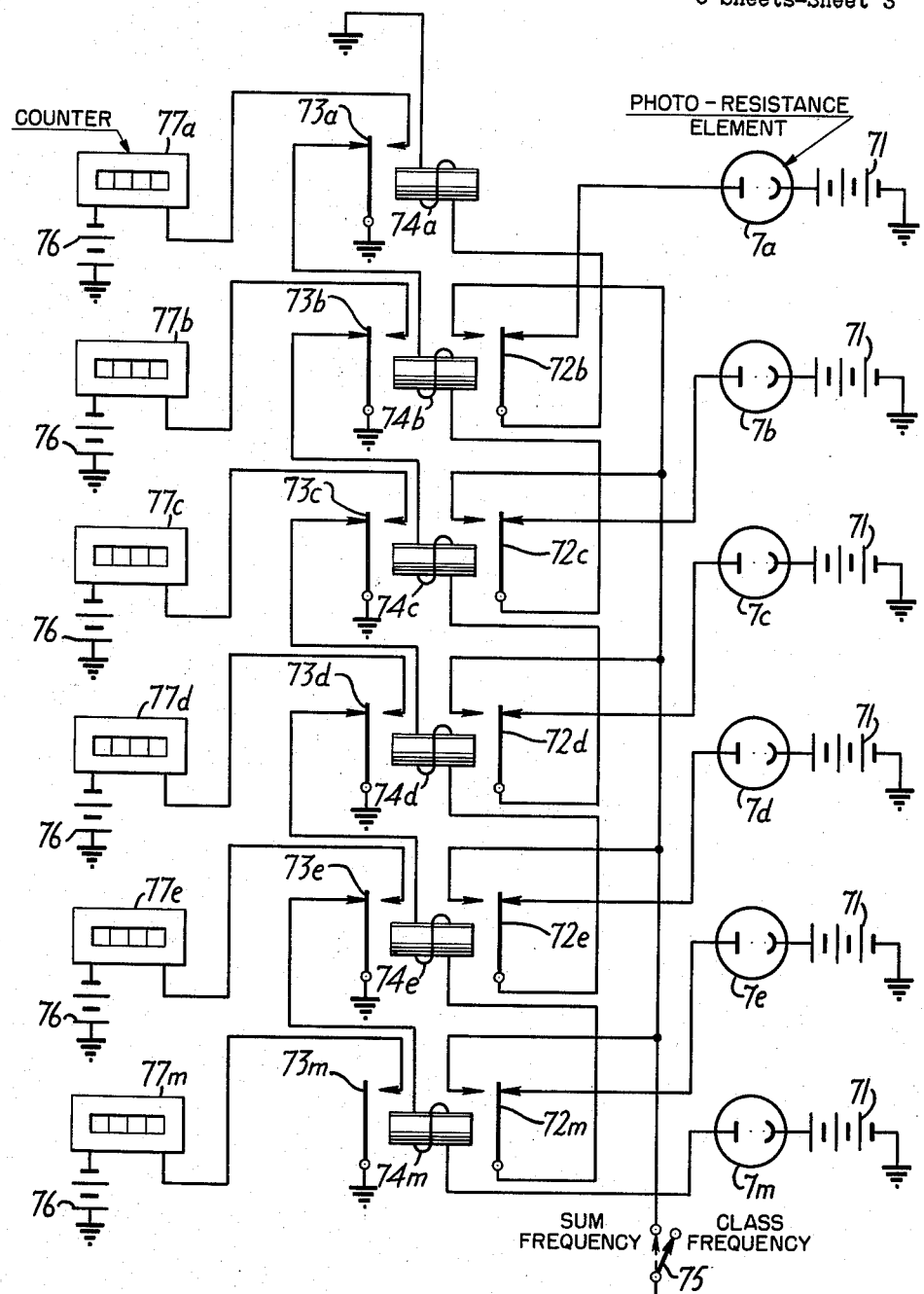

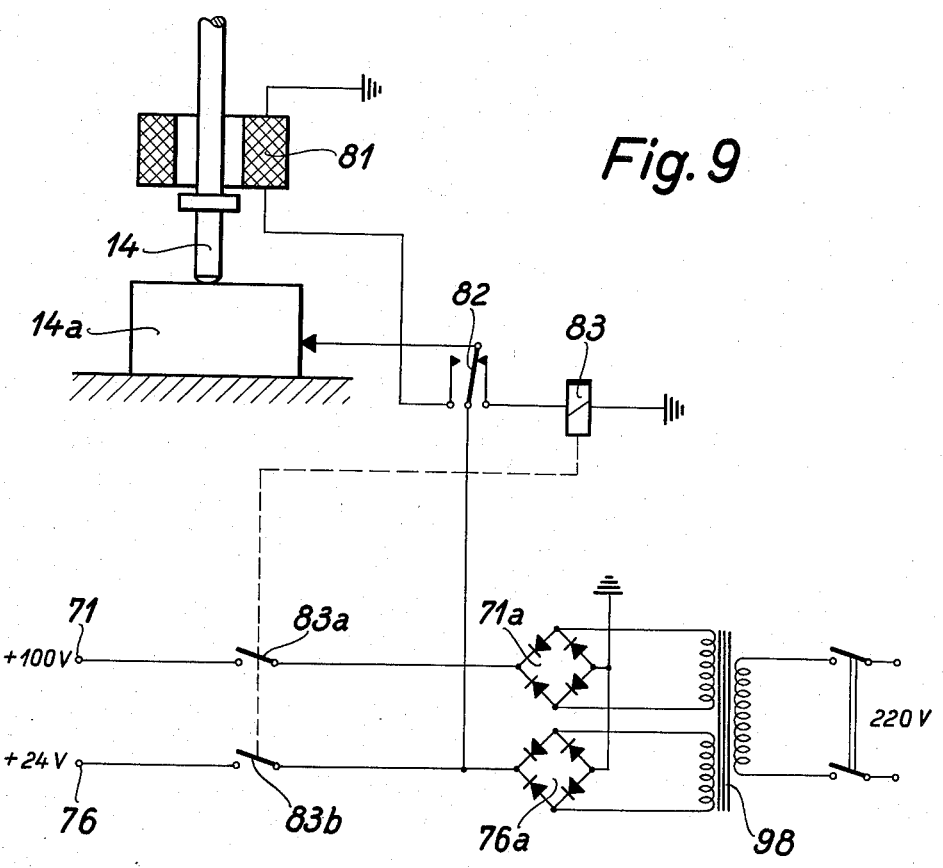

United States Patent Office

2,960,775
Patented Nov. 22, 1960

2,960,775

INSTRUMENT FOR STATISTICAL MEASUREMENTS

Wilhelm Rinker, Wetzlar (Lahn), Germany, assignor to Ernst Leitz G.m.b.H., Wetzlar, Germany, a German corporation Filed Nov. 5, 1957, Ser. No. 694,594

Claims priority, application Germany Nov. 6, 1956

11 Claims. (Cl. 33—172)

The present invention relates to measuring instruments and is directed particularly to an improved measuring instrument presenting an indication of the measurements and having a device for classifying the measurement results in different classes.

Prior instruments of the character described have, for instance, in addition to the measurement scale of the measuring instrument, a second scale bearing a class graduation. The values read on the second scale are noted and evaluated statistically at the conclusion of the measurement. For this purpose, however, it is first necessary to perform considerable calculations, since particularly in the case of series investigations in mass production, the total amount of the measurement results in an individual class (deviation range measured in, for example, microns) must first of all be determined. In order to facilitate this work, counting mechanisms have heretofore been manufactured which are operated by the operator in accordance with the value read from the class scale. In such a device, there is also the disadvantage that upon reading of the values or upon their introduction into a computer mechanism, errors will occur, due to fatigue on the part of the operator.

Purely electronic measuring instruments have also been developed in which the measurement results are indicated on the calculating mechanisms corresponding to the individual classes. The desired precision, particularly if different $\mu$-ranges (micron ranges or the ranges of deviations in millionths of an inch) are to be covered with the instrument, entails costly and complicated mechanisms, so that these instruments are very expensive. They are also considerably more sensitive to disturbance than the instruments of the first-mentioned type which operate on an optical-mechanical basis.

It is the principal object of this invention to provide an improved measuring instrument of the character described which combines the advantages of the abovementioned two types of instruments without having their disadvantages. The invention is characterized by the fact that in addition to an optical device having a spot of light for the indicating scale which is controlled by a test feeler, a second optical device is provided which has a spot of light controlled by the same test feeler to illuminate a photosensitive member composed of a plurality of elements, the width of the individual elements of the photosensitive member corresponding to the width of one class or particular range of dimensional deviations. The photosensitive member is connected with an electromechanical counting mechanism. It is preferable to provide the connection of the photosensitive member in circuit with the counting mechanism switchable in such a manner that either the class frequency (rate of occurrence of a particular range of deviation) or the total frequency of the measurement values (sum of the deviation rates) can be read from the counting mechanism. The counting mechanism can consist either of a number of individual counting mechanisms corresponding to the number of individual elements of the photosensitive member, or of a corresponding number of individual storage means which can be connected as desired to a single indicating device.

One particularly advantageous feature of the measuring instrument is that it has a setting device for the photosensitive member which makes it possible, by changing the length of the spot of light, to set the instrument to different $\mu$-ranges. It is advisable to provide in the ray path of the second optical device, deflecting means which are so adjustable as a function of the setting of the photosensitive member that the length of the optical path of the optical device containing the second spot of light is constant. Such construction has the advantage that any desired intermediate values of the $\mu$-ranges can also be set.

Other objects, features and advantages of the invention will be apparent from the following description when read with reference to the accompanying drawings.

In the drawings, illustrating by way of example how the invention may conveniently be embodied in practice:

Fig. 2 is a an embodiment by way of example of the setting device for the photosensitive member and the optical deflecting elements;

Fig. 3 is a second embodiment of the setting device for the photosensitive member and the optical deflecting elements;

Fig. 4 is a third embodiment of the setting device;

Figs. 8 to 10 are circuit diagrams for the electromechanical counting mechanism.

Figure 1:
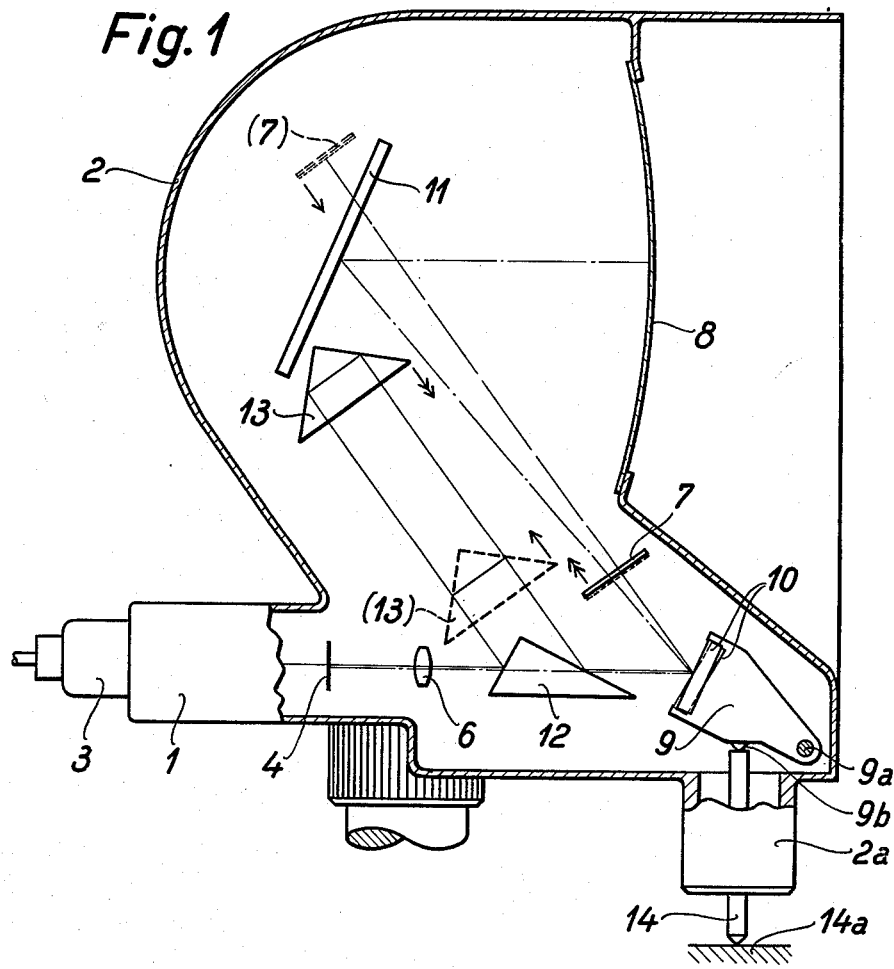
Fig. 1 is a partial vertical cross-sectional view of a measuring instrument in accordance with the invention.
Figure 5:
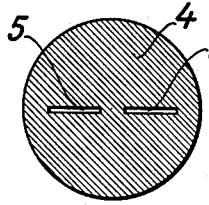
Figs. 5 and 6 are two embodiments, respectively, of diaphragms for producing the spots of light.
Figure 6:
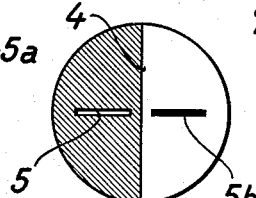

Referring now to the drawings, wherein like reference numerals denote corresponding parts throughout the several views, the improved measuring instrument is comprised of a housing 2 formed near its lower end with a cylindrical extension 1 fitted with a source of light 3 for illuminating a diaphragm 4 disposed near the inner end of said extension. The diaphragm 4 is provided with measuring marks which may be either two slits 5 and 5a (Fig. 5) or one slit 5 and, on a transparent background, an opaque mark line 5b (Fig. 6) which are projected by means of a lens 6 onto a photosensitive member 7 or an indicating scale 8 fixed in a front opening in the housing 2 and adapted to be viewed from the front of the apparatus.

In the image ray path of the one measuring mark 5a or 5b, there are arranged a mirror 10 carried by a measuring lever 9 pivoted to the housing 2 by pivot pin 9a, and a second mirror 11 rigidly fastened within the housing 2.

In the image ray path of the second measuring mark 5 there are provided between the lens 6 and the mirror 10 two deflecting prisms 12 and 13, prism 13 being displaceable. The measuring lever 9 has an abutment portion 9b positively connected with a measurement feeler rod 14 slidably arranged for axial motion in a downwardly extending cylindrical portion 2a of the housing 2. The photosensitive member 7 is displaceable in the opposite direction with respect to the deflecting prism 13.

In Figs. 1 to 4, the mirror 10, for a clearer showing, is illustrated as a surface mirror consisting of two surfaces inclined slightly with respect to each other.

Figure 7:
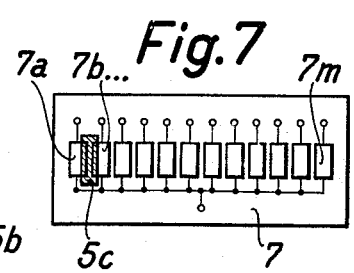
Fig. 7 is a view of the photosensitive member.

The photosensitive member 7 is divided into a plurality of individual elements 7a–7m arranged in a row and separated from each other, the number of which corresponds to the desired number of dimensional classes (see Fig. 7). The spacing adjacent ones of the individual elements 7a–7m is smaller than the width of the image 5c of the measuring mark 5.

The manner of operation of the device is as follows:

Upon the lowering of the measurement feeler rod 14 onto an object 14a to be tested, the lever 9 and thus the deflecting mirror 10 assumes a position which corresponds to the measurement of the object to be tested 14a. In this way the measurement mark 5a (or 5b) is projected onto a position of the indicating scale 8 corresponding to the position of mirror 10. The scale 8 can be designed either as a pure measurement scale or else as a scale subdivided to provide deviation indications with respect to a predetermined nominal value.

The other measurement mark 5 is simultaneously projected upon a zone of the photosensitive member 7 which corresponds to the position of the mirror 10. By the illumination of one of the elements 7a to 7m, an electrical pulse is produced which is imparted to registering mechanism which may be either a counting mechanism associated with the particular photosensitive element or an associated storage means.

As hereinbelow described in detail, means are provided in the electric circuit which, upon simultaneous illumination of two adjacent elements 7a–7m, permit passage only of the measurement pulse which comes from the more fully illuminated element. The several separate elements correspond to given deviation classes so that by the counting of the pulses, the total number of units having a particular deviation is automatically recorded.

In order to be able to use the instrument for different $\mu$-ranges, the photosensitive member 7 is supported displaceably with respect to the mirror 10. The nearer the member 7 is to the mirror 10, and the shorter therefore the "spot of light," the larger the $\mu$-range covered, and vice versa.

When the instrument is to operate in each $\mu$-range with the same precision, it is necessary that the measurement mark 5 is in each case projected in the same size on the member 7, in other words that the imaging scale and thus the total length of the image ray path must be maintained the same. This result is obtained in that the member 7 and the deflecting prism 13 are moved in opposite directions, the path of displacement of the latter being only half as great as that of the member 7.

This can be effected as illustrated in Fig. 2 in that there is fastened to the member 7 supported on a guide 21, a cable 22 which is guided over a fixed idler pulley 23 supported by the housing 2 and a second pulley 24 fastened to the mount 27 of the deflecting prism 13, the other end of said cable being fastened to the fixed support 25 of the deflecting prism 12. To the support 25 there is connected a guide device 26 on which the mount 27 of the displaceable deflecting prism 13 is slidably supported. The mount 27 is yieldingly urged upwardly under the action of a helical tension spring 28.

In accordance with another embodiment, illustrated in Fig. 3, the photosensitive member 7 is fastened to a rack 31 which is slidable in a fixed, vertically-extending guide member 31a. The rack 31 is in engagement with a rotatably journalled gear 32 the rotational axis of which remains stationary. On the shaft 33 of the gear 32 there is fastened a second gear 34 which has only half the number of teeth of the gear 32 and which is in engagement with a second rack 35 slidable in a fixed, vertically-extending guide member 35a. The mount 36 for the movable deflecting prism 13 is fastened to the rack 35.

In the embodiment shown in Fig. 4 a double cable is provided. To the photosensitive member 7 there is clamped a flexible tension cable 42, for example a steel cord, by means of a clamping device 41a. The clamping device 41a is vertically slidable on a fixed guide rod 41. The portion of the cable 42 which is shown in dotted lines is guided over a reversing pulley 49 fastened to the housing 2 and a second vertically movable reversing pulley 44 arranged on the mount 47 of the prism 13, its free end being anchored to the housing 2. On the other hand, the solid line portion of cable 42 is guided over a third reversing pulley 43 also supported on the housing 2 as well as over the reversing pulley 44 and fastened by means of a tensioning spring 48 to the housing 2.

In all three examples, upon a displacement of the member 7, the deflecting prism 13 is displaced positively in the opposite direction by half the path length. It is advisable to provide the guide 21 (Fig. 2) or the rack 31 (Fig. 3) or the guide 41 (Fig. 4) with detents which correspond to the setting of the member 7 at given $\mu$-ranges.

In Fig. 8 there is schematically shown an example of a suitable switching arrangement for the elements 7a to 7m. In this figure, the elements 7a to 7m are photoresistance elements each connected at one terminal to a common source of current 71 and connected at their remaining terminals via two sets of relay contacts 72b to 72m and 73a to 73m, respectively, actuated by relay windings 74a to 74m to ground. The relay contacts 72b to 72m, which are controlled by the corresponding relay windings 74b to 74m, are in each case included in the circuit of the preceding photo-element in the series, while the relay contacts 73a to 73m are in each case inserted in the circuit of the relay winding associated with the next subsequent photo-resistance. This means that there is associated with the photo-resistance 7d for example the relay winding 74d which, upon the illumination of the photo-resistance, actuates the relay contacts 72d in the circuit of the photo-resistance 7c and the relay contacts 73d in the circuit of the photo-resistance 7e.

The operated contact position of the relay contacts 72b to 72m is connected via a switch 75 with a second source of current 76. The operate contact position of the relay contacts 73a to 73m is connected in each case to a separate counting mechanism 77a to 77m which in turn are connected with the voltage source 76.

The operation of the circuit arrangement of Fig. 8 is as follows.

(a) With the switch 75 open ("Class Frequency" position): If for example the photo-resistance 7d is illuminated, current flows through the relay winding 74d. Upon energization of this relay the contacts 72d and 73d are acturated into their operated position, which is without importance in connection with contacts 72d, since switch 75 is open and, accordingly, no voltage to ground is present on operation of contacts 72d. Contacts 73d, however, now connect the counting mechanism 77d to ground so that current flows through this counting mechanism to cause a count of one unit.

As already described above (see also Fig. 7), the image 5c of the measurement mark 5 is wider than the space between adjacent individual elements 7a–7m so that two adjacent ones of said elements may be simultaneously illuminated. By the insertion of the relay contacts into the connections of the preceding or subsequent element, the result is now obtained that the corresponding counting mechanism is stepped forward only by the more strongly illuminated photo-resistance, since the connection of the more weakly illuminated photo-resistance is already interrupted before the response of its corresponding relay. In this position of switch 75, the class frequency is therefore counted.

(b) With switch 75 closed ("Sum Frequency" position): Upon illumination of the photo-resistance 7d, the counting mechanism 77d is stepped forward, as described above. Since now, however, the voltage source 76 is connected to the operated contact position of the relay contacts 72d, a current now also flows through relay winding 74c and actuates the contacts 72c and 73c. Thus there also takes place a further stepping forward of the counting mechanism 77c. Furthermore, in the same way the counting mechanisms 77b and 77a are also stepped forward by one unit. Since the relay winding 74a actuates only one set of contacts 73a, after the stepping forward of the counting mechanism corresponding to the illuminated photo-resistance and all preceding counting mechanisms, the measurement and counting process is at an end. With the switch 75 closed, the sum frequency (total of the deviation units) is therefore counted.

It is of course possible, with a somewhat greater expense, to obtain a greater sensitivity of the arrangement by using relay tubes, for instance cold cathode thyratrons, instead of the electromechanical relays. Likewise it is possible, in order to equalize different sensitivities of the elements 7a to 7m, to insert adjustable capacitors in their connections.

A circuit in accordance with Fig. 8 will however give satisfactory measurement results only if the measurement feeler rod 14 is lowered so rapidly for measurement on the test object, or raised again from it so rapidly after the measurement, that the light beam which reaches the photosensitive member 7, before coming to rest, does not dwell on any one of the individual photosensitive elements 7a–7m long enough to cause response of any of the counters 77a–77m. If this is not assured, a switch must be inserted in the supply lines, which switch is actuated only when the spot of light comes to rest on the reading scale 8. This switching can also be effected automatically upon placement of the test object in position for measurement, a switch simultaneously being employed for lowering the measurement feeler rod 14.

Such a circuit is shown in Fig. 9. The measurement feeler rod 14 is surrounded by an electromagnetic coil 81 which, upon energization of the instrument from the D.C. power supply comprising the power transformer 98 and the full-wave rectifier circuits 71a and 76a, raises said feeler rod. If the test object 14a is brought into the measurement position, a single-pole double-throw switch 82 is thereby actuated. As a result of this, the coil 81 becomes deenergized and the measurement feeler rod 14 drops upon the test object 14a. At the same time a relay 83 is connected to the source of current at the output of the rectifier 76a, which actuates its two associated supply switches 83a and 83b. The inherent delay caused by the operating time of relay 83 is sufficient to assure a dependable measurement.

Figure 10:
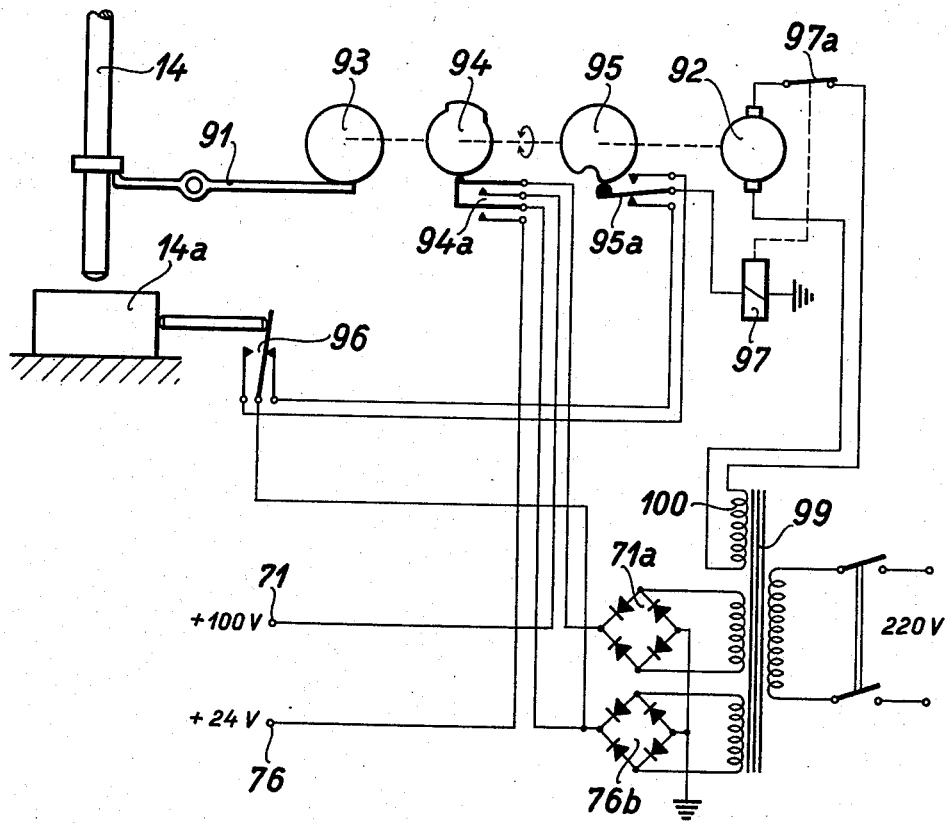

In the circuit arrangement illustrated in Fig. 9, the measurement feeler rod 14 is raised only after the withdrawal of the test object 14a. This can be avoided by an arrangement in accordance with Fig. 10, which represents a program control. The measurement feeler rod 14 is held by a straight lever 91 pivoted intermediate its ends, the free end of which rests against an eccentric disk 93 driven by a motor 92 with a speed reducer (not shown). On the shaft of the eccentric disk 93, there are also fastened two cam disks 94 and 95, which cooperate with two sets of switch contacts 94a and 95a respectively. Furthermore, there is provided a single-pole double-throw switch 96 which can be reversed by the application or removal respectively of the test specimen 14a. Power is supplied from the full-wave rectifiers 71a, 76b energized by a power transformer 99 fed from the A.C. service line. The transformer 99 has an additional secondary winding 100 for supplying current to the motor 92. This arrangement operates in the following manner:

Upon positioning of the test specimen 14a a relay 97 is connected to the source of current 76 via the switch 96 and the switch contact set 95a. The relay 97 thereupon connects the motor 92 to the source of current 98 by means of the relay switch 97a. The eccentric disk 93 is now driven by the motor 92 and the measurement feeler rod 14 is thus lowered onto the test object 14a via the lever 91. Next the cam disk 94 actuates the switch contact set 94a so that the two sources of current 71 and 76 are connected to the measuring arrangement. Upon further rotation of the motor 92, the switch contact set 94a is brought again into the initial position and the measurement feeler rod 14 is again raised. Finally the cam disk 95, by actuation of the switch contact set 95a connected with the switch 96 in a double-throw circuit, disconnects the motor 92. After the removal of the test object 14a, the motor 92 again becomes energized temporarily. After its disconnection again by the switch contact set 95a, the motor is driven further for a short time by its inertia, bringing the eccentric disk 93 as well as the two cam disks 94 and 95 back into the initial position.

While there are described and illustrated herein preferred embodiments of the invention, it is to be understood that these embodiments are presented by way of illustration only, and that various omissions, or changes in the arrangement of parts, as well as the substitution of equivalent elements for those herein shown and described, can be made without departing from the spirit and scope of the invention as defined by the following claims.

What is claimed is:

1. In a measuring instrument for the dimensional measurement of a series of objects with respect to a plurality of measuring classes, each class comprising a predetermined dimensional range, the combination comprising a support structure, a reflecting mirror movably secured with respect to said support structure, a feeler member, means controlling movement of said reflecting mirror in dependence upon the position of said feeler member with respect to said support structure, an indicating scale fixed with respect to said support structure, a photo-sensitive member adjustably secured with respect to said support structure, said photo-sensitive member having a plurality of separate photo-sensitive elements, the width of each of said elements corresponding to the width of a measuring class, a source of two spot beams of light fixed with respect to said support member, means including said reflecting mirror to reflect one of said spot beams upon said indicating scale, means including said reflecting mirror to reflect the other of said spot beams upon said photo-sensitive member, and circuit means connected with the elements of said photo-sensitive member and responsive to the particular element impinged upon by said other of said spot beams, said circuit means comprising registering mechanism separately responsive to impingement of said other of said spot beams on each of said elements of said photo-sensitive member.

2. The measuring instrument as defined in claim 1 wherein said registering mechanism registers class frequency of measurement.

3. The measuring instrument as defined in claim 1 wherein said registering mechanism registers the sum frequency of the measurement values.

4. The measuring instrument as defined in claim 1 wherein said registering mechanism comprises mechanism for selectively measuring either class frequency of measurement or the sum frequency of the measurement values.

5. The measuring instrument as defined in claim 4 wherein said registering mechanism comprises a plurality of individual counting members, one for each of said photo-sensitive elements.

6. The measuring instrument as defined in claim 1 further comprising means for adjusting the position of said photo-sensitive member with respect to said reflecting mirror for changing the class range.

7. The measuring instrument as defined in claim 6 including means to keep the length of the other of said reflected spot beam paths to said photo-sensitive member constant upon actuation of said photo-sensitive member adjusting means.

8. The measuring instrument as defined in claim 7 wherein said means to keep the length of the other of said reflected spot beam paths to said photo-sensitive member constant comprises a pair of triangular prisms one of which is interposed in the path of said other spot beam to said reflecting mirror and the other of which is displaceable with respect to said one prism, and mechanism for moving said other prism away from said one prism simultaneously with the movement of said photo-sensitive member toward said reflecting mirror.

9. The measuring instrument as defined in claim 8 wherein said other prism moving means comprises a first pulley rotatably journalled with respect to said support structure, a second pulley fixedly journalled with respect to said other prism and a cable fixed at one end with respect to said photo-sensitive member, extending under said first pulley and over said second pulley, and fixed at its other end with respect to said support structure.

10. The measuring instrument as defined in claim 8 wherein said other prism moving means comprises a shaft rotatably arranged with respect to said support structure, a first gear secured to said shaft, a second gear of one-half the diameter of said first gear secured to said shaft, a gear rack secured to said photo-sensitive member and in mesh with said first gear, and another gear rack secured to said other prism and in mesh with said second gear.

11. The measuring instrument as defined in claim 8 wherein said other prism moving means comprises a pair of spaced pulleys, a cable stretched between said pulleys at one side thereof, mechanism securing said photo-sensitive member to said stretched cable for movement therewith between said pulleys, a reversing pulley, said other prism being secured to said reversing pulley, one end of said cable being doubled around one side of said reversing pulley and being fixed with respect to said support structure, and the other end of said cable being doubled around the other side of said reversing pulley and being fixed with respect to said support structure.

References Cited in the file of this patent

UNITED STATES PATENTS

| | | |
|---|---|---|
| 1,859,020 | Brown | May 17, 1932 |
| 2,010,706 | Williams | Aug. 6, 1935 |
| 2,403,896 | Aller | July 16, 1946 |
| 2,569,579 | Rinker | Oct. 2, 1951 |
| 2,717,449 | Graham | Sept. 13, 1955 |
| 2,727,311 | Aller et al. | Dec. 20, 1955 |